US006546132B1

United States Patent
Bhattacharjya et al.

(10) Patent No.: US 6,546,132 B1
(45) Date of Patent: Apr. 8, 2003

(54) COLOR TABLE MANIPULATIONS FOR SMOOTH SPLICING

(75) Inventors: Anoop Bhattacharjya, Sunnyvale, CA (US); Hakan Ancin, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/401,339

(22) Filed: Sep. 21, 1999

(51) Int. Cl.[7] .................................................. G06K 9/00
(52) U.S. Cl. ........................................ 382/167; 358/518
(58) Field of Search ................................. 382/176, 276, 382/170, 254, 167, 164, 171, 165; 358/518, 523, 1.9, 504, 1.6, 514, 515, 539, 3.23

(56) References Cited

U.S. PATENT DOCUMENTS

| | | | |
|---|---|---|---|
| 5,471,324 A | 11/1995 | Rolleston | 358/518 |
| 5,477,335 A | * 12/1995 | Tai | 358/2.1 |
| 5,483,360 A | 1/1996 | Rolleston et al. | 358/518 |
| 5,489,998 A | 2/1996 | Yamada et al. | 358/523 |
| 5,491,568 A | 2/1996 | Wan | 358/518 |
| 5,568,269 A | 10/1996 | Jamzadeh | |
| 5,568,571 A | 10/1996 | Willis et al. | |
| 5,649,024 A | 7/1997 | Goldsmith | |
| 5,649,072 A | 7/1997 | Balansubramanian | 358/109 |
| 5,689,350 A | 11/1997 | Rolleton | 358/504 |
| 5,689,590 A | * 11/1997 | Shirasawa et al. | 358/518 |
| 5,734,802 A | 3/1998 | Maltz et al. | 358/1.9 |
| 5,739,927 A | 4/1998 | Balasubramanian et al. | 358/518 |
| 5,760,920 A | 6/1998 | Lin et al. | 358/3.2 |
| 5,809,181 A | 9/1998 | Metcalfe | |
| 5,809,213 A | 9/1998 | Bhattacharjya | 358/1.6 |
| 5,852,678 A | * 12/1998 | Shiau et al. | 358/462 |
| 6,269,184 B1 | * 7/2001 | Spaulding et al. | 345/604 |

\* cited by examiner

*Primary Examiner*—Timothy M. Johnson
*Assistant Examiner*—Ali Bayat
(74) *Attorney, Agent, or Firm*—Mark P. Watson (57) ABSTRACT

We improve text reproduction of a scanned and printed image by identifying text-contribution colors and also image-contribution colors that are in or near the text region of the color space. When input colors are encountered that contribute both to text and image we splice together text and image color transformations of the input color to produce a color in the printer color space. We improve background reproduction, i.e. reduce bleed-through artifacts, by identifying background-contribution colors and also image-contribution colors that are in or near the background region of the color space. When input colors are encountered that contribute both to background and image we splice together background and image color transformations of the input color to produce a color in the printer color space.

14 Claims, 7 Drawing Sheets

COLOR TABLE MANIPULATIONS FOR SMOOTH SPLICING

CROSS-REFERENCE TO RELATED APPLICATIONS

This application is related to commonly assigned application Ser. No. 09/400,787, filed on the same date as the present application, and entitled "Color Table Manipulations For Contour Reduction".

BACKGROUND OF THE INVENTION

1. Field of the Invention

The present invention is related to digital color image reproduction systems and more particularly to color calibration of such systems. Typically such systems include an input device such as a scanner for scanning a color image and for producing scanner color signals representing that image, an output device such as a printer for reproducing the color image, and a digital image processor for transforming the scanner color signals into printer color signals. In particular, the present invention relates to a system and method for improving reproduction quality when a scanner and printer are combined to form a copy unit. The present invention also relates to a software program for implementing the method for improving copy quality and media on which the program is recorded or carried.

2. Description of the Related Art

The generation of color documents can be thought of as a two step process: first, the generation of the image by scanning an original document with a color image input terminal or scanner or, alternatively, creating a color image on a work station operated with a color image creation program; and secondly, printing of that image with a color printer in accordance with the colors defined by the scanner or computer generated image.

Each color peripheral device such as a color scanner or a color printer uses a device-dependent color-coordinate system to specify colors. These coordinates are often specified in some color space that is most suitable for mapping the color coordinates to the color-generation mechanism of the device. The term color space refers to an N-dimensional space in which each point in the space corresponds to a color. For example, an RGB color space refers to a three-dimensional device color space in which each point in the color space is formed by additive amounts of red (R), green (G) and blue (B) colorants. Scanner output is commonly transformed to a color space of tristimulus values, i.e., RGB (red-green-blue). Commonly, these values are a linear transformation of the standard XYZ coordinates of CIE color space, or a corrected transform of those values.

In the case of computer generated images, color defined by the user at the user interface of a workstation can be defined initially in a standard color space of tristimulus values. These colors are defined independently of any particular device, and accordingly reference is made to the information as being "device independent".

Printers commonly have an output which can be defined as existing in a color space called CMYK (cyan-magenta-yellow-key or black) which is uniquely defined for the printer by its capabilities and colorants, i.e. it is a device-dependent color space. Printers operate by the addition of multiple layers of ink or colorant in layers on a page. The response of the printer tends to be relatively non-linear. These colors are defined for a particular device, and accordingly reference is made to the information as being "device dependent". Thus, while a printer receives information in a device independent color space, it must convert that information to print in a device dependent color space, which reflects the gamut or possible range of colors of the printer. Printers and other image rendering devices may use more or less than the above-mentioned 4 color channels (i.e., c, m, y, and k) to represent color.

There are many methods of conversion between color spaces, all of which begin with the measurement of printer (or scanner) response to certain input values (or colors). Commonly, a printer is driven with a set of input values reflecting color samples throughout the printer gamut, and the color samples are printed in normal operation of the printer. As previously noted, most printers have non-linear response characteristics.

The information derived is typically placed into three-dimensional look up tables (LUTs) stored in a memory, such as a read-only-memory (ROM) or random-access-memory (RAM). The look up table relates input color space to output color space. The look up table is commonly a three dimensional table since color is defined with three variables. The three variables used to index the LUT correspond to tristimulus values that may represent RGB or a standard color space such as CIE XYZ. RGB space, e.g. for a scanner or computer, is typically defined as three dimensional with black at the origin of a three dimensional coordinate system 0, 0, 0, and white at the maximum of a three dimensional coordinate system. For example, for a 24-bit color system (8-bits/color), white would be located at 255, 255, 255. Each of the three axes radiating from the origin point therefore respectively define red, green, and blue. In the 24-bit system suggested, there will be, however, over 16 million possible colors ($256^3$). There are clearly too many values for a 1:1 mapping of RGB to CMYK. Therefore, the look up tables consist of a set of values which could be said to be the intersections (lattice points, nodes, etc.) for corners of a set of cubes mounted on top of one another. Colors falling within each cubic volume can be interpolated from the nodes forming the cube, through many methods including tri-linear interpolation, tetrahedral interpolation, polynomial interpolation, linear interpolation, and any other interpolation method depending on the desired accuracy of the result, behavior of the function being sampled, and computational cost.

It would be very easy to index (map) device dependent color values or specifications to device independent color values, but that is not what is required. Rather, device independent specifications (i.e. colors specified in a device independent color space) must be mapped to device dependent specifications (i.e. corresponding colors in the device dependent color space). Several problems arise. Of course, the primary problem is that the printer response is not a linear response, and the inverse mapping function may not be unique especially when the dimensions of the input and output color spaces are different. A second problem is that the color space, and therefore the coordinates defined in the color space must be maintained as a uniform grid for maximum efficiency of some interpolation methods.

Accordingly, a multidimensional look up table (LUT) may be constructed which puts device independent input values into a predictable grid pattern. One method of accomplishing this requirement is by an interpolation process referred to as weighted averaging and another method is inverse tetrahedral interpolation.

The technique or method for producing the LUT is selected according the best result that can be obtained for the particular device. For example in a particular printer it may be found that the weighted averaging technique produced a table which gave good color reproduction in one region of color space (the light colors), but not in another (the dark colors). The tetrahedral inversion technique may produce just the complement of this, i.e., it may give good color reproduction where the weighted average technique did not (the dark colors), and give poorer color reproduction of colors where the weighted average technique gave good color reproduction (the light colors).

Similar to the above problem, it has been noted that often, after a change in process parameters due to time, change of materials, refilling toner, etc., a change in calibration is required only in a portion of the overall color gamut of a printer. Re-calibration of the entire space is costly in terms of processing time. It is desirable to only re-calibrate a portion of the color space, or alternatively, to use the best portions of the color space mapping.

Further, we have found that when an independently calibrated scanner is put together with an independently calibrated printer, certain reproduction artifacts turn up in the copy. These include contouring artifacts that appear in certain types of copied images, such as skin tones and sky tones. Such artifacts are quite common if the input and output devices have been calibrated using different standard spaces, e.g., a scanner may be calibrated to be linear with respect to luminance while a printer may be calibrated to be linear with respect to ink density. This problem is addressed in commonly assigned application Ser. No. 09/400,787, filed on the same date as the present application, and entitled "Color Table Manipulations For Contour Reduction", which application is incorporated herein by reference in its entirety.

We have found also that combining an independent scanner with an independent printer can result in slower throughput than a conventional copier due to the intercommunication paths that comprise physical cables connecting the scanner, printer and possibly a physically separate processing unit interfacing the scanner and printer. To increase the throughput speed, we scan at a resolution, e.g. 300 dpi (dots-per-inch), that is lower than a comparable conventional copier, which may scan at 400 dpi, for example. While this increases the speed at which the image can be processed, it may result in a degradation of certain high frequency components, e.g. small text, in the image. In addition, we have found that certain colors appear in the background that should actually appear white. This can sometimes result from colors bleeding through from the opposite side of the page when it is scanned.

OBJECTS OF THE INVENTION

Therefore, it is an object of the present invention to overcome the aforementioned problems.

It is an object to provide a calibration system that effectively calibrates an input device/output device system where the input device and output device have been separately calibrated.

Another object is to provide an effective system for revising the color transformation LUTs after the input and output device are combined for only those colors that are used to represent text or a white background, while maintaining the original calibration for the balance of the color space.

A further object of the invention is to provide an effective system for improving text reproduction and/or white background reproduction when a particular input device is combined with a particular output device.

Yet a further object of the invention is to provide a software program for performing the method of the present invention. The software program can be stand-alone, resident on the image processing unit of the present invention, recorded on media readable by the image processing unit or embodied on a carrier wave that can be input to the image processing unit.

SUMMARY OF THE INVENTION

Figure 2:
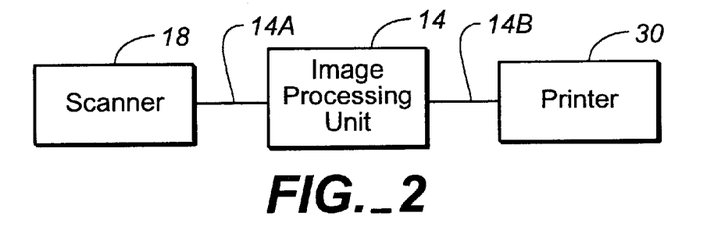
FIG. 2 is a block diagram of a exemplary copier system of the present invention.

A exemplary color reproduction system of the present invention is shown in FIG. 2 and includes a scanner 18, a printer 30 and an image processing unit 14, which, in part, interfaces the scanner and printer and controls the data transfer through the system. The scanner and printer are connected to the processing unit by communication paths which physically comprise cable connections such as a Small Computer System Interface (SCSI) bus 14A, and a parallel port bus 14B. These communication links tend to slow the throughput of the system. In order to speed up the system, the scanner is operated at 300 dpi, for example, in contrast to the 400 dpi typically employed in the scanning unit of an integrated color copier. The actual resolution will vary but will typically be lower in the system of FIG. 2 than in an integrated copier that is comparable in speed. This lower scanning resolution reduces the amount of data that passes through the system and thereby increases the speed with which an image can be processed. However, one drawback is that small text may not be accurately reproduced and the text portion of a scanned document may be degraded. In addition, scanners inherently act as low pass filters and may degrade the high frequency text. Therefore, text enhancement schemes are typically provided in the processing unit. Normally, these involve scanning the entire image and parsing it in to text regions and image regions. The text regions are high-pass filtered to sharpen and improve the text quality. Further, background is enhanced by suppressing bleed-through artifacts. Unfortunately, these processes are computationally intensive and burden and slow the image processing unit 14.

The present invention is intended to provide a fast method of text enhancement by manipulating the color transformation tables rather than scanning and filtering the entire image. In effect, we introduce contours in the color table for only those colors that are found in text or background but not for those colors that are found in image. We do this by first looking at the scanner color space and marking out "text colors", i.e. dark, low saturation colors found in the lower corner of the color space. This is done empirically by first choosing a set of text colors and then in the color transformation table we map all identified text colors to a selected color, e.g. black, i.e. in a 8-bit per component RGB system, the red, green and blue color values would all be 0; the brightness would be 0 and saturation 0. Then we scan standard color charts to see the effect of our initial choice. When we review the result of the scanned color chart we find that certain of our choices have resulted in "image colors", e.g. dark blue, that have been converted to black. We then assign those colors as "image" rather than "text". This is an experimental process that depends somewhat on the person reviewing the results of the scanned color charts.

Figure 3:
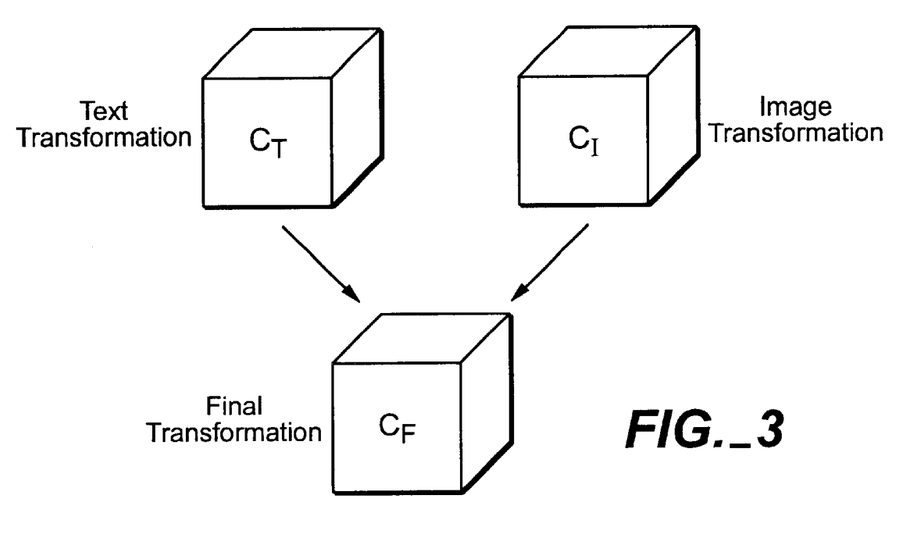
FIG. 3 is a representation of the merging of two types of color information in the present invention.

The result of the initial part of our process is a set of boundaries in the scanner color space which define text colors that we would like to make darker when they are encountered in a scanned page and image colors that we would like to maintain when they are encountered. These boundaries will overlap in some areas. We then, in effect, form two look-up-tables (LUTs) as shown in FIG. 3. One is a text transformation table for text colors $C_T$ and the other is an image transformation table for image colors $C_I$. The text transformation table maps text colors toward darker, less saturated tones. The image transformation table maps image colors in a normal color-matching fashion, i.e., according to the original color space transformation.

Figure 4:
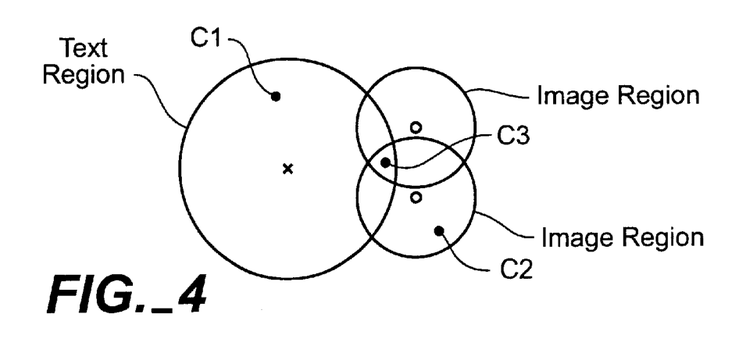
FIG. 4 is a representation of the color table splicing operation of the present invention.

These two tables are spliced to form a final color transformation table. As mentioned, the text and image boundaries overlap for some portions of the color space. This is illustrated in FIG. 4. The splicing of the two tables occurs as follows. For an encountered color, e.g. C1, that falls exclusively in the text region, it is replaced by a corresponding darker, less saturated color in the text transformation. For a color, e.g. C2, falling exclusively in an image region, it is mapped to a matched color by the image transformation table. For a color, e.g. C3, that falls in the intersection of the text region and one or more of the image regions, the color transformation is a linear combination of the two or more tables. In general, the closer the color is to the center of the text region the more it will be effected by the text transformation. The linear combination is formed by a splice function that weights the contribution from the text and image tables. This weighting can be altered to give sharp or smooth transitions.

The effect of the present invention is to improve the reproduction quality of text without slowing the throughput of the system. Text is enhanced on-the-fly as it passes through the color transformation regions rather than through a separate processing/filtering operation. The text enhancement of the present invention may also be used to complement normal text enhancement processing.

Alternately, or in combination, we apply the same process to "white colors", i.e. those colors in our sample images that appear in the background and which we want to be white in our replicated image. We do this by first looking at the scanner color space and marking out "white colors", i.e. bright, low saturation colors found in the upper corner of the color space. Again, this is done empirically by first choosing a set of white colors and then in the color transformation table we map all identified white colors to a selected color, e.g. white, i.e. in a 8-bit per component RGB system, the red, green and blue color values would all be 255; the brightness value would be 255 and saturation 0. The balance of the process corresponds to the text color process as described above.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts:

FIGS. 6 through 10 are flowcharts showing the general steps of the method of the present invention.

DESCRIPTION OF THE PREFERRED EMBODIMENTS

Figure 1A:
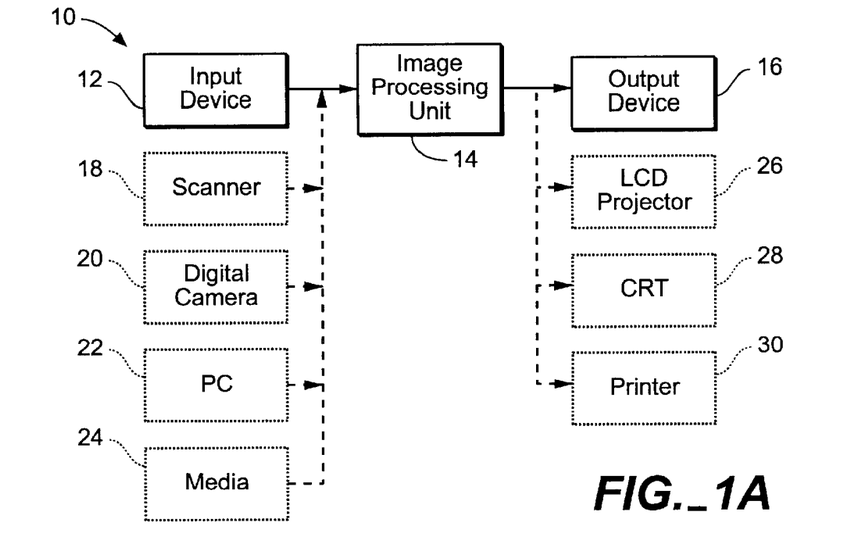
FIGS. 1A, 1B and 1C are block diagram representations of various general configurations of an image handling unit of the present invention.
Figures 1B, 1C:
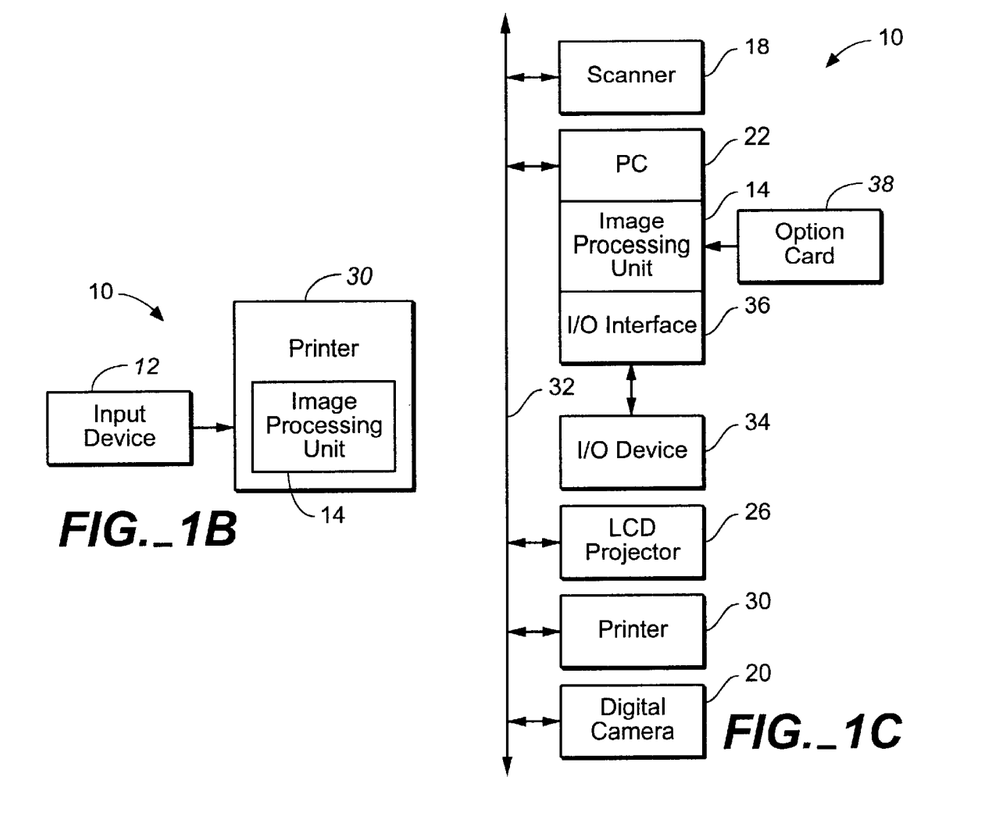

Reference is now made to FIGS. 1A, 1B and 1C which show the general configuration of an image handling unit 10. As shown in FIG. 1A, imaging handling unit 10 has three major components, an input device for providing a source image S, an image processing unit 14 for processing the source image and an output device 16 for displaying or printing the processed image. The input device 12 can take various forms such as a scanner 18, digital camera 20, personal computer (PC) 22 or media 24 (e.g. hard disk or diskette, floppy disc, optical disc). The output device 16 can also take various forms such as an LCD projector 26, CRT 28 or printer 30.

The image processor 14 may be implemented in hardware with discrete components, software, firmware, application specific integrated circuits (ASICs), or any combination thereof. Also, the functional blocks of the image processor are divided in this specification for convenience of description only. The functional and physical boundaries of these blocks will vary from device to device. For example, FIG. 1B shows the image processor physically integrated with the printer 30. Portions of the image processor may be associated functionally more with the input device than with the output device or vice versa. FIG. 1C shows an embodiment of an image handling unit 10 with the image processor formed as part of a personal computer (PC) 22 which may control operation of and communication between the image processing unit, LCD projector, scanner, printer, and control of and communication with peripheral equipment such as I/O device 34, each connected directly or indirectly to a PC Bus 32. In this embodiment, the source image may be have been previously stored (and perhaps enhanced through processing) in an I/O device 34 and can be loaded into the PC through I/O interface 36, or the image may be captured with a digital image input device such as a digital camera 20. In addition, the image processing unit 14, in the form of software, may be loaded into the PC's memory from an external storage device, i.e. I/O device 34. Alternately, the image processing unit in the form of hardware, ASIC, firmware, etc. or combination thereof can be embodied on an option card 38 that can be inserted into an available PC card slot.

While the present invention is applicable to any such device having these basic components, for the sake of illustration only the invention will be described in the environment of a particular image handling unit 10 shown in FIG. 5. The image handling unit 10 includes scanner 18, printer 30 and image processing unit 14 that, in part, provides an interface between them. As discussed above, image processing unit 14 is shown as a separate block with a number of separate functional units contained therein. However, image processing unit 14 or portions thereof may be physically located in the scanner and/or printer. Also, the illustrative image processing unit 14 is shown with internal buses on which status and control information may be communicated, as well as color image signals.

Figure 5:
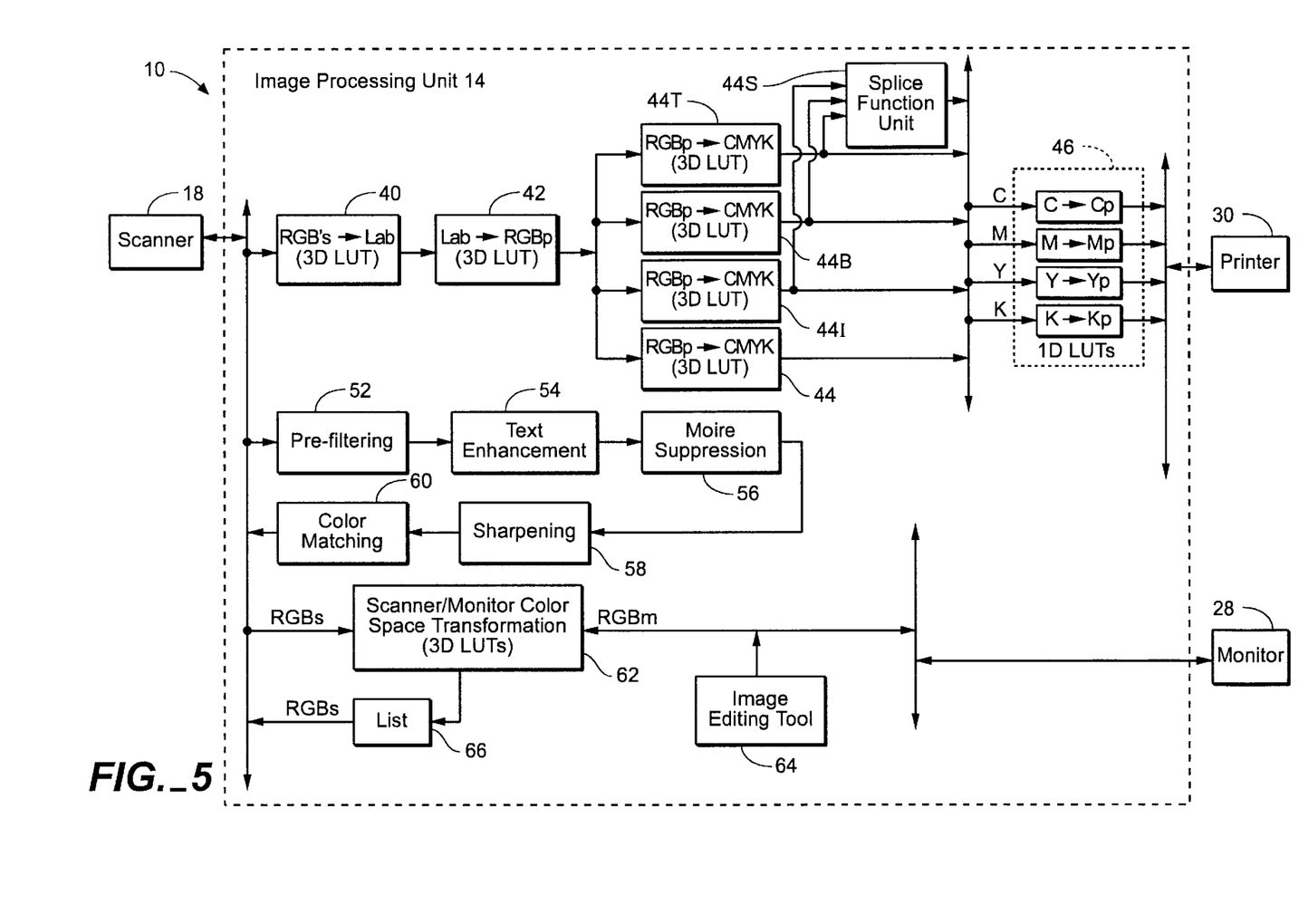
FIG. 5 is a schematic block diagram of a portion of the major functional components of the present invention.

As shown in FIG. 5, the image processing unit has an image processing pipeline with a number of functional components. The functional blocks shown are illustrative but not limiting and the present invention may be utilized in systems having more or less processing blocks, which may be ordered in the pipeline differently than in the example shown. The image processing pipeline may include, for example, pre-filtering unit 52, text enhancement unit 54, moire suppression unit 56, sharpening unit 58 and color matching unit 60. In addition, the processing pipeline will include a color-space-transformation pipeline including 3D LUTs 40, 42 and 44, and 1-D LUTs 46.

The color-space-transformation pipeline enables conversion of colors defined in the scanner color space to colors defined in the printer color space. The scanner output is commonly defined in RGB (red-green-blue) color space. A canonical scanner representative of a type/model of scanners is calibrated to form a 3D lookup-table (LUT) 40 that converts the scanner colors RGBs to colors in a device independent color space, such as CIELab (Lab). Other frequently used device independent color spaces are CIEXYZ or CIELUV space. There are various methods known in the art for deriving color calibration look-up tables, and a detailed discussion of such methods is not necessary for an understanding of the present invention.

The output of LUT 40 will be a color defined in Lab space. LUT 42 converts those color coordinates in Lab space into corresponding color coordinates in an RGB space for the printer. These printer colors are designated as $RGB_P$. However, it is typically more useful to define the printer output in a CMYK (cyan-magenta-yellow-key or black) color space that is uniquely defined for the printer according to its physical attributes and colorants. A canonical printer representative of a type/model of printers is calibrated to form a 3D look-up-table (LUT) 44 that converts the printer colors $RGB_P$ to colors in CMYK color space. This calibration is done in a factory with a printer that is representative of a particular type and model. However, printers, even of the same type and model, tend to vary somewhat one to another. The 1D LUTs 46 are provided to accommodate such variations by adjusting the CMYK levels on a per-channel basis. Thus, for a particular printer 30, the 1D LUTs modify the 3D LUT 44, but only for particular colors or only in a limited way while maintaining most of the calibration that was done for the factory canonical printer.

Unlike a conventional copier, where the scanning function and printing function are in a physically integrated device that permits an exact closed-loop calibration, the system shown in FIG. 5 cannot be exactly calibrated until the system is put together with a particular scanner and a particular printer. Remember also that look-up-tables are too small to map one-to-one all colors in one color space to all colors in another color space. In a typical 24-bit system, for example, there will be over 16 million colors. Thus, only a limited number of sample colors are used to build the tables. The entries in the tables are lattice points or nodes forming cubes (3-dimensional volumes) that divide up the color space. When an actual color is encountered, it will be represented by one of the lattice points or more likely fall somewhere within one of these cubes, in which case its value in the device dependent color space must be approximated from the lattice points forming the cube in which it falls. A variety of interpolation techniques are known in the art for computing the color values of non-lattice points. These include, for example, trilinear, prism, and tetrahedral interpolation.

The present invention comes into play when the system of FIG. 5 is put together with a particular scanner and a particular printer. The LUTs that are built for the particular scanner and particular printer will generally produce good results when they are concatenated to form the color space transformation pipeline shown in FIG. 5. However, when put into use it may be found that small text in an image may not be faithfully replicated and/or bleeding artifacts may appear in the white or background areas of the printed copy.

The present invention solves this problem by first empirically determining which colors are used to produce text and which colors are used for a white or light background. There is no way to know this a priori. We must use the system once it is put together to see how it operates under usual working conditions. We first make the assumption that the scanner is more stable than the printer. That is, the scanner 18 of image processing unit 10 is more likely to behave like the factory canonical scanner than is the printer 30 likely to behave like the factory canonical printer. Thus, in altering our transformation tables we concentrate on the color transformation into printer color space, as will be discussed hereinafter.

Figure 6:
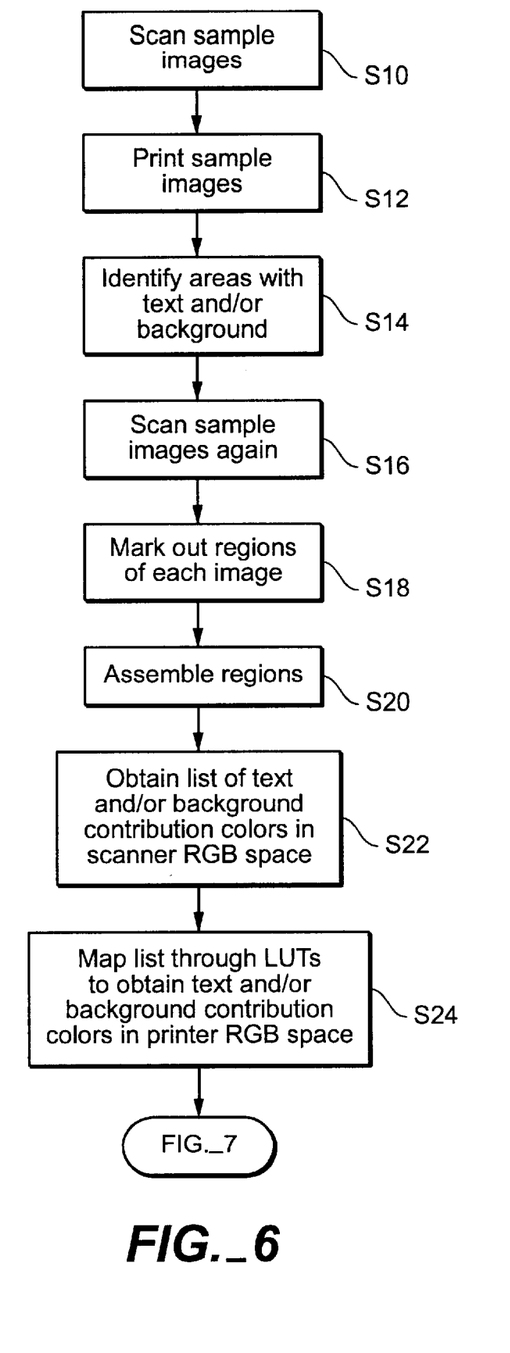
Figure 7:
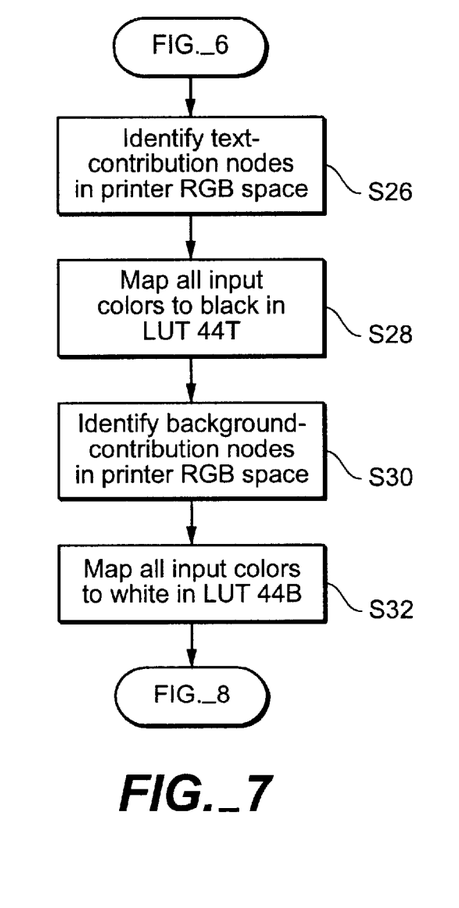

With reference to FIGS. 6, 7 and 8, in order to identify the colors of interest, we scan, with scanner 18, a number of sample images (step S10) (i.e. pictures, mixed mode images with graphics and text, photos, etc.) that contain a wide variety of images where text appears and/or where bleed-through artifacts may appear, and we print those images (S12) on printer 30. We then observe and identify the text and/or background areas in each printed image (step S14). This is an empirical test and its outcome depends to some degree on the observer. It also depends on the universe of sample images. The opportunity to identify all colors that may be involved in producing text and/or background increases with a large and diverse sample image universe. Note that the present invention may be used for text enhancement alone or bleeding artifact reduction alone or for a combination of the two. For purposes of discussion only, both features are used but they are independent of one another.

We then mark out regions in the sample images where the text and/or background appear. This can be done by scanning each image (step S16) and displaying it on a screen, i.e. CRT or computer monitor 28. The colors represented in scanner color space $RGB_S$ are mapped into monitor color space $RGB_M$ by scanner/monitor color transformation LUT 62. We "mark out" the regions of interest (step S18) in each displayed image using, for example, a cropping function of an image editing tool 64, such as Adobe Photoshop, which can be stored in image processing unit 14. Remember that these regions of interest are those areas of the image that we found had text and or background when we printed the image on printer 30. We can then assemble these regions of interest (step S20), i.e. cropped segments, again using an image editing tool 64. This assembly of regions of interest then corresponds to all colors that are involved in forming images where text and/or background appear in our system. For the purpose of explanation, we will refer to this set of colors as text and/or background-contribution colors. From the physical location of the selected regions on the page, the colors of interest in the scanner space, $RGB_S$, are identified and collected in a list 66 of text and/or background-contribution colors (step S22).

Now that we have identified the set of text and/or background-contribution colors in the scanner space we then identify them in the printer color space $RGB_P$. We do this by mapping the colors in list 66 through LUTs 40 and 42, which results in a set of text and/or background-contribution colors in the printer color space $RGB_P$ (step S24). As discussed above, only a small subset of colors in a color space correspond exactly to entries (lattice points, nodes) in the 3 look-up tables. Most colors fall within cubes defined by the nodes. Thus, we identify all the nodes in the printer color space that form the three-dimensional cubes in which the text-contribution colors are located (step S26). For the purpose of explanation, we will refer to this set of nodes as text-contribution nodes, which form the entries in three-dimensional LUT 44T. In LUT 44T we map all input colors to a selected color, e.g. black, in cmyk space (step S28). We also identify all the nodes in the printer color space that form the three-dimensional cubes in which the background-contribution colors are located (step S30). For the purpose of explanation, we will refer to this set of nodes as background-contribution nodes, which form the entries in three-dimensional LUT 44B. In LUT 44B we map all input colors to a selected color, e.g. white, in cmyk space (step S32). Note that, for explanation purposes, LUT 44T and LUT 44B are shown as separate units. However, it will be appreciated that although they are functionally separate from LUT 44, they may be physically stored in the same memory.

Next, we test our original choices of text and background colors to see how these choices work. We do this by scanning standard color charts with scanner 18 (step S34) and printing the charts on printer 30 (step S36). We may find that our original choices result in some scanned colors, e.g. dark blue, resulting in black in the printed chart, or another color, e.g. light yellow, resulting in white. So, we wish to identify regions in the color space that encompass image colors that are near text or near white colors. We do this by "marking out" the regions of interest (step S38) in each color chart again using, for example, a cropping function of an image editing tool 64, such as Adobe Photoshop. These regions of interest are those areas of the color charts that we found had near-text and or near-background image colors that were printed black or white when we printed the color chart on printer 30. We can then assemble these regions of interest (step S40), i.e. cropped segments, again using an image editing tool 64. This assembly of regions of interest then corresponds to all colors that are near in the color space to the text or background colors, but are used for image. For the purpose of explanation, we will refer to this set of colors as image-contribution colors. From the physical location of the selected regions on the page, the image-contribution colors in the scanner space, RGBS, are identified and collected in list 66, which is now a list of image-contribution colors (step S42).

Now that we have identified the set of image-contribution colors in the scanner space we then identify them in the printer color space $RGB_P$. We do this by mapping the colors in list 66 through LUTs 40 and 42, which results in a set of image-contribution colors in the printer color space $RGB_P$ (step S44). As discussed above, only a small subset of colors in a color space correspond exactly to entries (lattice points, nodes) in the 3 look-up tables. Most colors fall within cubes defined by the nodes. Thus, we identify all the nodes in the printer color space that form the three-dimensional cubes in which the image-contribution colors are located (step S46). For the purpose of explanation, we will refer to this set of nodes as image-contribution nodes, which form the entries in three-dimensional LUT 44I. In LUT 44I we map the input colors to a matching output color (step S48) using our original color transformation scheme as used to build original LUT 44.

Recall that in order to identify the image colors that were near the text colors or background colors we mapped all text input colors in LUT 44T to one output color, e.g. black, in step S28, and mapped all input background colors in LUT 44B to one output color, e.g. white, in step S32. However, now that we have identified the image colors of interest, we revise the mapping scheme in LUTs 44T and 44B.

Preferably, in LUT 44T we map all input text colors to a darker, less saturated color in the output color space (step S50). This provides sharper text in the output image and the degree of sharpness achievable will be system dependent. Preferably, in LUT 44B we map all input background colors to a lighter, less saturated color in the output color space (step S52). This provides a reduction in bleed-through artifacts in the output image and the degree of reduction achievable will be system dependent.

The nodes that bound the text-contribution colors, background contribution colors and image contribution colors form three-dimensional volumes (spheres) in the color space. FIG. 4 shows a two dimensional example with a text region sphere (circle in the figure) bounding the text-contribution colors and one, two or more image regions spheres (circles in the figure) bounding the image-contribution colors. A similar figure could be drawn to illustrate the sphere of background-contribution colors and one or more near image-contribution colors. As discussed above, in testing our original choices for text (background) colors, we found certain colors that are near the text (background) colors that may be used for either image or text (background). Since we have identified the image colors that are near the text colors, the image region spheres may overlap the text region sphere, as illustrated in FIG. 4.

Once we have identified the text-contribution colors, background-contribution colors and image-contribution colors that and are bounded the nodes in LUTs 44T, 44B and 44I (conceptually spheres in the color space), we can map input colors to output colors as follows.

Figure 10:
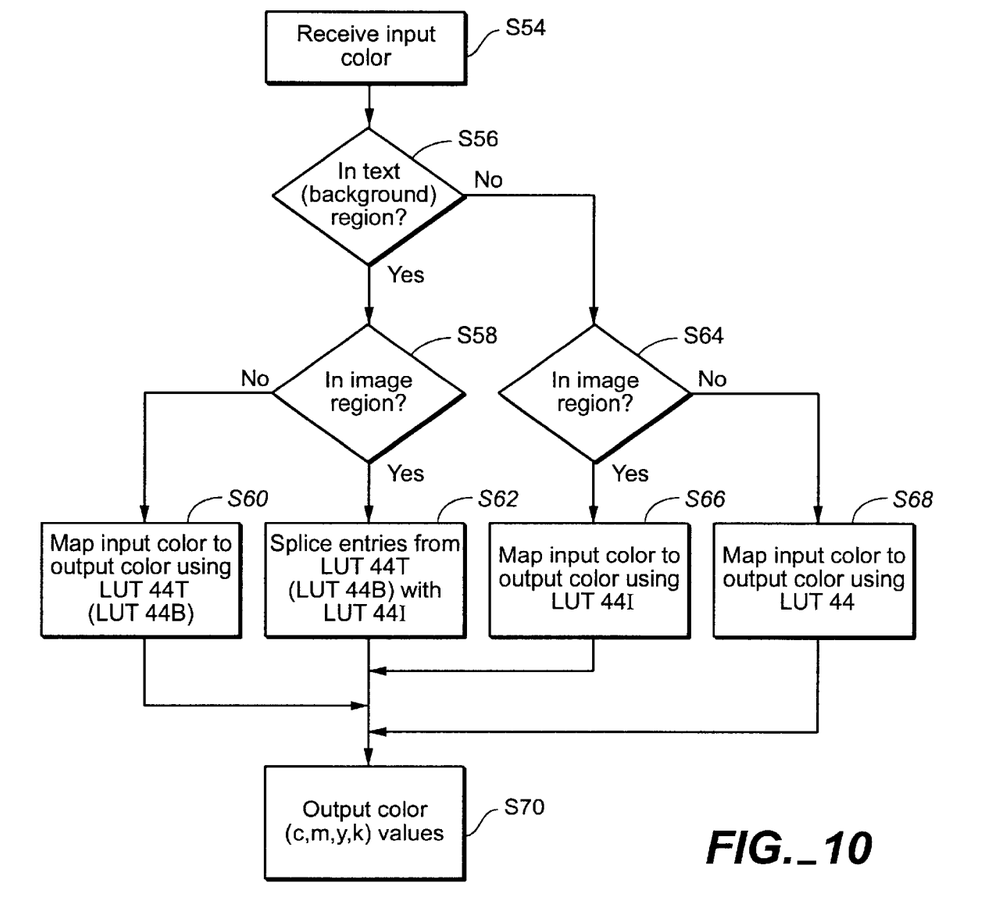

FIG. 10 illustrates the flow of the mapping function of the present invention. The input color is received at step S54. At step S56, we determine if the input color is a text (background) color, i.e. within the text (background) region of the color space as defined by the entries into LUT 44T (LUT 44B). If the input color is a text (background) color, we then determine at step S58 if it is in an image region, i.e. within the image regions of the color space as defined by the entries into LUT 44I. If it is not in an image region, we map the input color to an output color using LUT 44T for text colors or LUT 44B for background colors (step S60). For text colors, this mapping will preferably involve mapping the input color to a darker, less saturated color in the output color space. For background colors, this mapping will preferably involve mapping the input color to a lighter, less saturated color in the output color space.

At steps S56 and S58, if we determine that the input color is a text (background) color and an image color, i.e. it falls in the intersection or overlap between the text (background) region of the color space and the image region(s) of the color space, then we map the input color to an output color using a splicing function (step S62) that will be described in further detail hereinafter.

Referring back to step S56, if we determine that the input color is not in the text (background) region, we then determine if it is in an image region at step S64. If it is in an image region, we map the input color to an output color using LUT 44I (step S66). This mapping function preferably maps the input color to the nearest matching color in the output color space.

At step S64, if the input color is not in an image region, as defined by entries into LUT 44I, then we map the input color to an output color using LUT 44 (step S68). This is the original color transformation mapping for the system. For most input colors the mapping to the output color space will occur through LUT 44, thus preserving the original color transformation that was developed for the scanner 18 and printer 30 forming the copy system.

In each of the flow paths described above, the result will be a color in the output device (i.e. printer) color space (step S70). In the preferred embodiment shown in FIG. 5, this output color will be mapped through the 1D LUTs 46 to produce c, m, y and k values that drive printer 30. Alternately, if 1D LUTs 46 are not provided the c, m, y, and k color values produced in step S70 will be used to drive printer 30.

Referring back to step S62, the splice function of the present invention will now be described. The splice function is applied if an input color falls within both the text (background) region and an image region. An example is shown in FIG. 4. Input color C3 falls in the intersection between the text (background) color space and at least one image color space (actually two in the example shown). The splice function yields an output color that combines the influence of both the text (background) mapping and the image mapping. One example is a linear combination of the two mappings. The location of color C1 is projected onto the line that connects the centers of the text (background) color space and one image color space. The closer the projection point is to the center of the text (background) color space the more its mapped color value is influenced by the text (background) color mapping. This can be expressed by $$C_{OUT} = \alpha C_I + (1-\alpha) C_{T(B)},$$

where $C_{OUT}$ is the mapped (output) color value, $C_{T(B)}$ is the color value resulting from the text (background) color mapping, $C_I$ is the color value resulting from the image color mapping, and $\alpha$ can be one of the following two functions:

$$\alpha = (2x - x^2)^\beta \text{ or } \alpha = x^\beta,$$

where x is the distance on the line connecting the centers of text (background) color space and one image color space I and $\beta$ is selected to control the sharpness of transition between near colors in the intersecting color space. If the input color is at the center of the text (background) color space, for example, then x=0, $\alpha$=0, and the input color is mapped according to the text (background) color mapping alone. As an input color falls more closely to the image color sphere center, the more it is influenced by the image color mapping.

Remember that we derived the image color spheres (and their corresponding entries in the LUT 44I by testing our original assumptions about text (background) colors and then identifying colors that are near the text (background) colors in the color space but actually contribute to image colors as well. As a result an input color may actually fall in a text (background) color sphere (conceptually—actually on a node or within nodes in LUT 44T or LUT 44B) and also fall within two or more image color spheres (i.e. within nodes defining the spheres). This is shown conceptually in FIG. 4 by input color C3. In this case we apply the splice function as described above, projecting the color onto the line connecting the centers of text (background) color space and one image color space, applying the splice function, projecting the color onto the line connecting the centers of text (background) color space and another image color space, applying the splice function, and averaging the results to arrive at the output color.

The splice function provides smooth transitions between text (background) colors and near image colors without making all colors in or near the text region darker and all colors in or near the background region lighter. The present invention provides greater control over the mapping of these colors and thereby prevents unnecessary color distortion of the image portions while improving the text and/or background portions.

Figure 11:
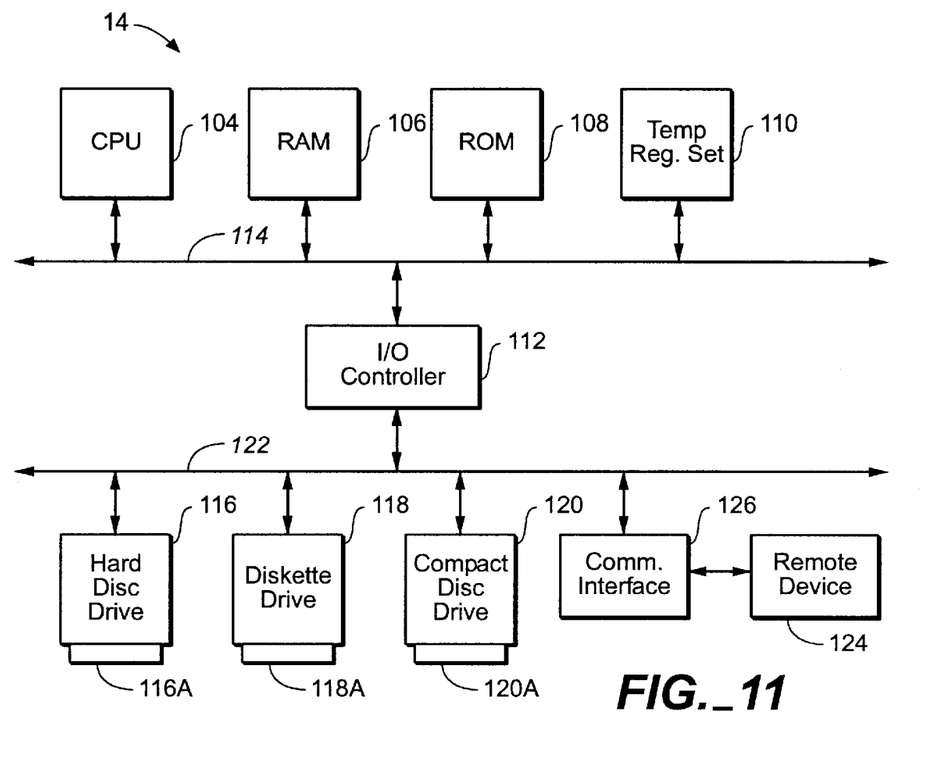
FIG. 11 is a schematic block diagram of another portion of the major functional components of the present invention.

While in the foregoing example the image processing unit 14 is shown as a separate block comprising its various functional units, image processing unit 14 may also comprise parts of other system components such as personal computer 22. As shown in FIG. 11, it may further include, for example, a central processing unit (CPU) 104, memories including a random-access-memory (RAM) 106, read-only memory (ROM) 108 and temporary register set 110, and an input/output controller 112, all connected to an internal bus 114. Although for the sake of illustration each of the above units are shown separately, these functional units may form part or all of the various functional units previously described such as the look up tables 40, 42, etc., splice function unit 44S, image editing tool 64, list 66, etc. Further, depending on the nature of the system, e.g. a scanner and printer as part of a centrally controlled network, the functional units may be part of a general purpose computer programmed to control the scanning and printing devices. Additionally, it will be appreciated that these functional units may be implemented with discrete components, application specific integrated circuits, processors executing appropriate software and the like or any combination thereof.

Each of the methods of the present invention are implemented, in one embodiment, in a software program or programs outlined in the flow diagrams and their accompanying descriptions set forth above. These programs as well as operating system software and/or application specific software for operating the scanner 18, printer 30 and/or the image processing unit 14 and/or the various functional units described herein may be stored in any combination of the memories 106, 108 and 110 or may be stored externally in one or more of the I/O units including hard disc drive unit 116, diskette drive unit 118, and compact disc drive 120, each connected to I/O Bus 122. Software programs for operating the various functional units and/or for implementing the method of the present invention may be stored on a medium such as hard disc 116A, diskette 118A or compact disc 120A, or may be stored at a remote device 124 and input on a carrier wave through communications interface 126.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An image processing apparatus for improving text reproduction for an image input by an input device and output by an output device, comprising:

an input device that receives said image;

a first three-dimensional look up table that receives color information representing said image from said input device and transforms colors specified in an input device color space into colors in a device-independent color space;

a second three-dimensional look up table that receives colors from said first three-dimensional look up table and transforms colors specified in a device-independent color space into colors in an output device first color space;

a third three-dimensional look up table that receives text colors from said second three-dimensional look up table and transforms text colors specified in said output device first color space into text colors in an output device second color space;

a fourth three-dimensional look up table that receives image colors from said second three-dimensional look up table and transforms image colors specified in said output device first color space into image colors in said output device second color space;

a splice unit that receives text colors in said output device second color space from said third three-dimensional look up table and image colors in said output device second color space from said fourth three-dimensional look up table and outputs a combination output color in said output device second color space; and an output device that receives color information representing said images specified in said output device second color space and outputs said image.

2. An apparatus according to claim 1 further comprising:

a marking unit for identifying text regions of sample images where text appears when said sample images are output from said output device;

a list of text colors corresponding to said identified text regions; and a set of nodes in said third three-dimensional look up table that encompass said list of text colors.

3. An apparatus according to claim 1 further comprising:

a marking unit for identifying image regions of sample images where image colors appear next to text colors when said sample images are output from said output device;

a list of image colors corresponding to said identified image regions; and a set of nodes in said fourth three-dimensional look up table that encompass said list of image colors.

4. An apparatus according to claim 1 wherein said marking unit comprises a display device.

5. An apparatus according to claim 1 wherein said marking unit comprises an image editing tool.

6. An apparatus according to claim 1 wherein said input device is a scanner.

7. An apparatus according to claim 1 wherein said output device is a printer.

8. An image processing apparatus for improving background reproduction for an image input by an input device and output by an output device, comprising:

an input device that receives said image;

a first three-dimensional look up table that receives color information representing said image from said input device and transforms colors specified in an input device color space into colors in a device-independent color space;

a second three-dimensional look up table that receives colors from said first three-dimensional look up table and transforms colors specified in a device-independent color space into colors in an output device first color space;

a third three-dimensional look up table that receives background colors from said second three-dimensional look up table and transforms background colors specified in said output device first color space into background colors in an output device second color space;

a fourth three-dimensional look up table that receives image colors from said second three-dimensional look up table and transforms image colors specified in said output device first color space into image colors in said output device second color space;

a splice unit that receives background colors in said output device second color space from said third three-dimensional look up table and image colors in said output device second color space from said fourth three-dimensional look up table and outputs a combination output color in said output device second color space; and an output device that receives color information representing said images specified in said output device second color space and outputs said image.

9. An apparatus according to claim 8 further comprising:

a marking unit for identifying background regions of sample images where background appears when said sample images are output from said output device;

a list of background colors corresponding to said identified background regions; and a set of nodes in said third three-dimensional look up table that encompass said list of background colors.

10. An apparatus according to claim 8 further comprising:

a marking unit for identifying image regions of sample images where image colors appear next to background colors when said sample images are output from said output device;

a list of image colors corresponding to said identified image regions; and a set of nodes in said fourth three-dimensional look up table that encompass said list of image colors.

11. An apparatus according to claim 8 wherein said marking unit comprises a display device.

12. An apparatus according to claim 8 wherein said marking unit comprises an image editing tool.

13. An apparatus according to claim 8 wherein said input device is a scanner.

14. An apparatus according to claim 8 wherein said output device is a printer.

* * * * *